United States Patent [19]
Palmer et al.

[11] Patent Number: 4,476,963
[45] Date of Patent: Oct. 16, 1984

[54] AUTOMATIC ADJUSTER FOR A SHOE DRUM BRAKE

[75] Inventors: Christopher W. Palmer, Birmingham; Ronald M. Hughes, West Midlands, both of England

[73] Assignee: Lucas Industries Limited, Birmingham, England

[21] Appl. No.: 325,643

[22] Filed: Nov. 30, 1981

[30] Foreign Application Priority Data

Dec. 6, 1980 [GB] United Kingdom ............... 8039220
Jun. 4, 1981 [GB] United Kingdom ............... 8117121

[51] Int. Cl.³ .................... F16D 51/52; F16D 65/38
[52] U.S. Cl. .................... 188/79.5 B; 188/196 BA
[58] Field of Search ............ 188/79.5 B, 196 BA, 188/79.5 P

[56] References Cited

U.S. PATENT DOCUMENTS

| | | | |
|---|---|---|---|
| 2,287,238 | 6/1942 | Goepfrich | 188/79.5 B |
| 2,570,398 | 10/1951 | Smith | 188/79.5 B |
| 3,983,970 | 10/1976 | Courbot | 188/79.5 B |
| 4,015,693 | 4/1977 | Hayashida et al. | 188/79.5 P |
| 4,148,380 | 4/1979 | Haraikawa | 188/79.5 B |
| 4,385,681 | 5/1983 | Conrad et al. | 188/79.5 B |
| 4,390,086 | 6/1983 | Conrad | 188/79.5 B |

FOREIGN PATENT DOCUMENTS

| | | | |
|---|---|---|---|
| 1507550 | 4/1978 | United Kingdom | 188/79.5 B |
| 2021265 | 11/1979 | United Kingdom | . |
| 2024422 | 1/1980 | United Kingdom | . |

Primary Examiner—Bruce H. Stoner, Jr.
Assistant Examiner—Robert J. Oberleitner
Attorney, Agent, or Firm—Holman & Stern

[57] ABSTRACT

An adjuster for a shoe drum brake has a variable length strut for maintaining a predetermined maximum shoe to drum clearance. A thermally responsive body of shape memory effect material (SME material as defined in the Specification) is arranged to move the brake shoes outwardly by extending the strut to compensate for drum expansion during excessive temperature conditions. Alternative arrangements are described using a body of (SME) material to disable the adjuster during excessive temperature conditions.

5 Claims, 5 Drawing Figures

AUTOMATIC ADJUSTER FOR A SHOE DRUM BRAKE

BACKGROUND OF THE INVENTION

1. Field of the Invention

This invention relates to an automatic adjuster for a shoe drum brake, primarily for motor vehicles, including a device of automatically variable length arranged and operable, in use, in response to wear of the brake shoe linings, to maintain a predetermined maximum shoe to drum clearance. The invention also embraces a shoe drum brake incorporating such an automatic adjuster.

2. Description of the Prior Art

Such adjusters, in various forms, are widely used in motor vehicle braking systems and are generally satisfactory under most conditions of use. However, under certain conditions, such as prolonged braking during a long hill descent, for example, the resultant heating of the drum causes the latter to expand, which has the effect of increasing the shoe to drum clearance and thereby causing the adjuster to produce a compensatory adjustment of the shoes. It is then possible for subsequent contraction of the drum, upon cooling, to bring the drum permanently into contact with the shoes in their newly adjusted retracted positions, thereby locking on the brake. If the adjuster is arranged so as to leave sufficient running clearance to preclude this possibility, then the amount of shoe travel required to enable the shoes to contact the drum during operation at normal temperatures is unacceptably high.

Bi-metallic devices have been used in an attempt to solve this problem and, in one prior proposal applied to an adjuster incorporating a variable length strut between the shoes, a bi-metallic device is disposed between a pair of relatively movable parts of the adjuster strut and sustains any force transmitted through the strut, such as hand brake actuation loads for example. Not only are bi-metallic devices limited in the compensatory effect which they can provide, but in the aforesaid arrangement the bi-metallic device can sometimes be crushed when excessive loads are applied through the strut and for this reason the arrangement can sometimes be unsatisfactory when employed in adjusters in which adjustment takes place while the strut is sustaining a high compressive load.

BRIEF SUMMARY OF THE INVENTION

An object of the present invention is to provide an adjuster which, without the use of a bi-metallic device, operates in a manner which solves the over-adjustment problem and can be arranged, in a strut adjuster, to achieve this effect without having to sustain very high loads transmitted through the strut. The adjuster of the invention is thus more flexible in application than some conventional adjusters having thermal compensation means.

According to the present invention, an automatic adjuster for a shoe drum brake incorporates a thermally responsive body of shape memory effect (SME) material (as herein defined) arranged and acting, at least during brake actuation, in response to an increase in temperature of the brake either to cause outward movement of the shoes in order to compensate, at least in part, for drum expansion, or to disable the adjuster during such time as the brake is subject to said increase in temperature.

"Shape Memory Effect" is used in the field of metallurgy, and in this Specification, is used as a generic term for materials that will undergo a thermoelastic martensitic transformation. Such materials exhibit much greater magnitudes of deflection than materials which undergo simple thermal expansion as governed by their coefficients of expansion.

In one typical arrangement, the adjuster is in the form of a strut of automatically variable length for disposition between the brake shoes, and the thermally responsive body is arranged to act to produce an increase in the length of the strut upon heating of the body and a corresponding decrease in the length of the strut upon cooling of the body.

Preferably, the strut has a pair of longitudinally separable parts and it is convenient for the body to surround one of said parts and to be in abutment, by its respective ends, with both parts. Very preferably, and especially with the aforesaid preferred strut construction, the body is in the form of a spiral coil.

Very desirably, said strut parts are arranged to transmit compressive loads applied to the strut independently of the thermally responsive body; preferably this is achieved by direct abutment of the two strut parts.

When the body of (SME) material acts to disable the adjuster in response to an increase in temperature, this may conveniently be achieved by arranging the body to act so as to prevent an adjusting movement of a movable adjuster part.

The body of (SME) material may conveniently be arranged to move a locking device into a locking position, in response to said increase in temperature, such that said device then prevents adjusting movement of said adjuster part. Again, the body is preferably in the form of a spiral coil.

In one convenient practical arrangement, the adjuster comprises a two-part strut extending between the shoes, one of the strut parts being a lever pivotally mounted on the second strut part and co-operating with toothed means rigid with said second strut part, the lever having a projection which co-operates directly or indirectly with one of the brake shoes, and the arrangement being such that excessive separation of the brake shoes upon brake actuation, as a result of wear of the friction linings, results in separation of the lever from the toothed means and angular movement of the lever, whereby the lever re-engages with the toothed means in a fresh position, when the brake is released, to increase the effective length of the strut, said locking device acting, when moved by the body of (SME) material in response to said increase in temperature, to prevent the aforesaid angular movement of the adjuster lever.

The adjuster lever and locking device may conveniently be provided with complementary toothed formations which are disengaged during normal operation of the brake, but brought into engagement by the action of the body of (SME) material in response to said increase in temperature, in order to prevent said angular movement of the adjusting lever.

Alternatively, in a pawl-operated type of adjuster in which adjusting movement of the pawl is controlled by a spring, the spring is composed, at least in part, of shape memory effect (SME) material, whereby, during excessive heating of the brake, expansion of the spring is sufficient to prevent actuation of the adjuster.

BRIEF DESCRIPTION OF THE DRAWINGS

The invention will now be described, by way of example, with reference to the accompanying drawings wherein.

DETAILED DESCRIPTION

Figure 1:
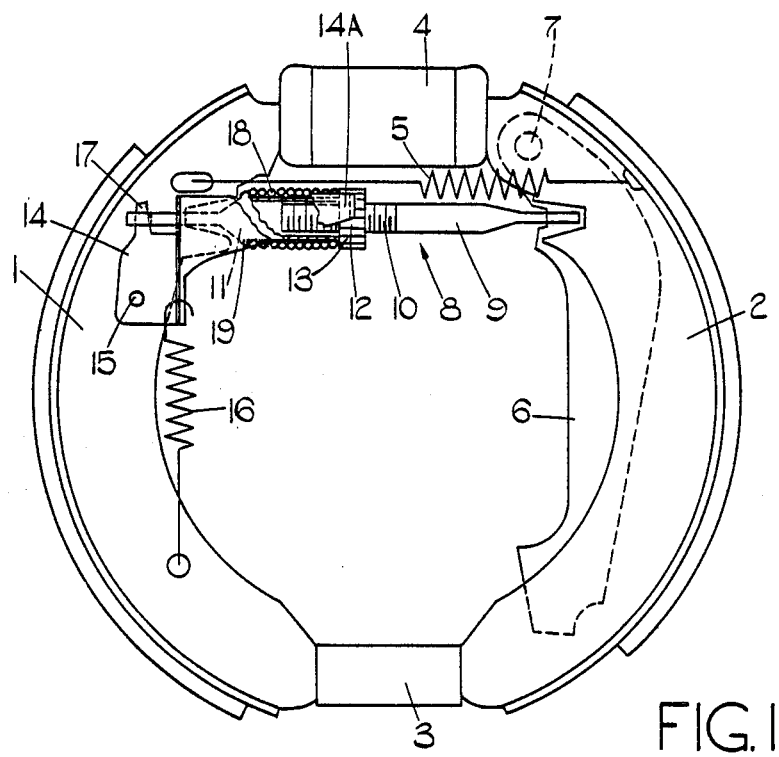
FIG. 1 is an elevational view, partly in cross-section, of a vehicle shoe drum brake, in non-operative condition, incorporating one form of the adjuster of the invention, the latter being shown in its ambient temperature condition.

Referring to the drawings, the drum brake illustrated therein comprises a pair of brake shoes 1, 2 arranged within a brake drum (not shown), the shoes having one pair of adjacent ends in engagement with an abutment 3 and the other pair of adjacent ends co-operating with a hydraulic actuator 4, operation of which urges the shoes 1 and 2 apart into contact with the drum, against the action of a shoe return spring 5. Alternative actuation of the shoes is possible by means of a hand brake lever 6 which is pivoted on the shoe 2 by means of a pin 7 and actuates the brake upon clockwise angular movement, in conventional manner.

An automatic strut adjuster, indicated generally at 8, extends between the shoes 1, 2 at a location adjacent to the actuator 4. The adjuster strut comprises a male element 9 having an externally threaded end portion 10 received freely within a female element 11. The outer end portions of the strut elements 11 and 9 are slotted and receive respectively the shoes 1 and 2, the element 9 also receiving the hand brake lever 6 within its slotted end, in conventional manner. The male element carries a nut 12 in threaded engagement with the threaded portion 10 and has ratchet teeth 13 on its external cylindrical surface engaged by a pawl lever 14 pivoted to the shoe 1 by means of a pin 15. The shoe return spring 5 exerts a compressive force on the strut and a pawl spring 16 urges the pawl lever 14 in a clockwise direction so that a lug 17 of the pawl lever always abuts the female strut element 11. The shoe return spring 5 exerts a stronger force than the spring 16 so that the shoe 1 is maintained in abutment with the strut element 11 within the slotted end of the latter when the brake is in its inoperative condition.

A thermally responsive device of shape memory effect (SME) material, shown in the form of a spiral coil 18 surrounds the female strut element 11 and is in abutment at one end with a shoulder 19 formed on the element 11 and at the other end against the nut 12.

When service actuation of the brake is effected by operation of the actuator 4, the shoes 1 and 2 are urged apart against the action of the shoe return spring 5. Since the adjuster 8 is urged by the spring 16 via the lever 14 to the right, as seen in the drawing, the strut will be maintained against the brake shoe 2 and the shoe 1 will separate from the adjuster at its normal point of contact with the female element 11. The clockwise pivotal movement of the lever 14 consequent upon movement of the adjuster to the right, results in a downward movement of the end 14A of the lever 14. If this movement is sufficient to move the end 14A of the lever from one ratchet tooth of the nut 12 to the next tooth, as would happen if outward movement of the shoes 1 and 2 is excessive, the nut 12 is rotated in a direction such as to lengthen the adjuster 8 and thereby reduce the non-operative shoe to drum clearance of the shoes.

During actuation of the brake at normal temperatures, the strut elements 9 and 11 remain firmly in abutment with each other and the coil 18 has no effect upon the actuation of the brake. If, however, the brake is subjected to excessively high temperature, as for example as a result of frequent brake application during a steep downhill descent, the drum expands and, without the thermal compensating body 18 would permit temporary excessive shoe movement and cause the adjuster to compensate for this, with the resultant possibility of locking on the brake as it cools. In the brake of the invention, however, occurrence of excessive temperature causes the coil 18 to increase rapidly in length, when the strut is relieved of the shoe return spring force upon actuation so as to move the male and female portions of the strut apart and thereby increase the length of the strut. The force of the spring 16 is chosen so that it is overcome by expansion of the coil 18 and the coil is designed so that the compensatory expansion of the shoes approximates to the expansion taking place in the drum, which means the shoe to drum clearance will be maintained at approximately the value which it has during normal temperature conditions. Operation of the brake at high temperature will therefore continue in substantially the same manner as for low temperature conditions, without adjustment of the shoes taking place, other than to compensate for excessive wear, in the normal manner. As the drum cools, the coil 18 shrinks towards its initial length, and the male and female strut portions are enabled to return to their abutting condition during actuation.

An important secondary feature of the invention is that the male and female parts 9 and 11 of the adjuster are in direct abutment at all times other than when thermal compensation is occurring during service actuation, so that very high loads, such as those arising during hand brake application for example, can be applied through the adjuster and none of those loads are sustained by the coil 18. If the hand brake is applied during a hot drum condition, i.e. when the coil 18 has expanded and moved the male and female adjuster portions apart, application of excessive load to the strut will cause sufficient compression of the coil 18 to once more bring the male and female portions into abutment so that such load is once again transmitted through the adjuster portions and not through the coil 18. In this way, damage to the coil 18 is avoided and, in this respect, the adjuster of the invention is superior to some prior art arrangements incorporating a temperature compensating device which is subject to loads transmitted through the strut.

Figure 3:
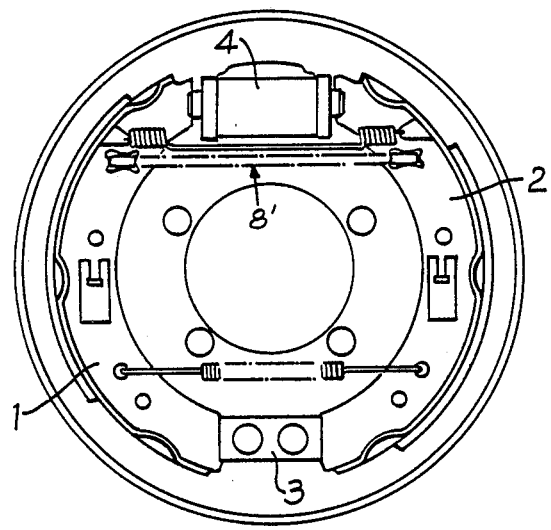
FIG. 3 is an end elevational view of a shoe-drum brake incorporating an alternative embodiment of the adjuster of the invention.
Figure 5:
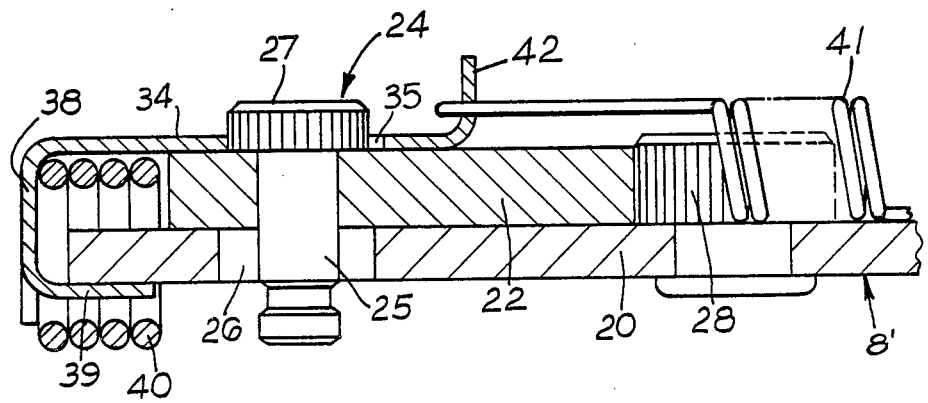
FIG. 5 is a cross-sectional view of the adjuster of FIG. 4.
Figure 4:
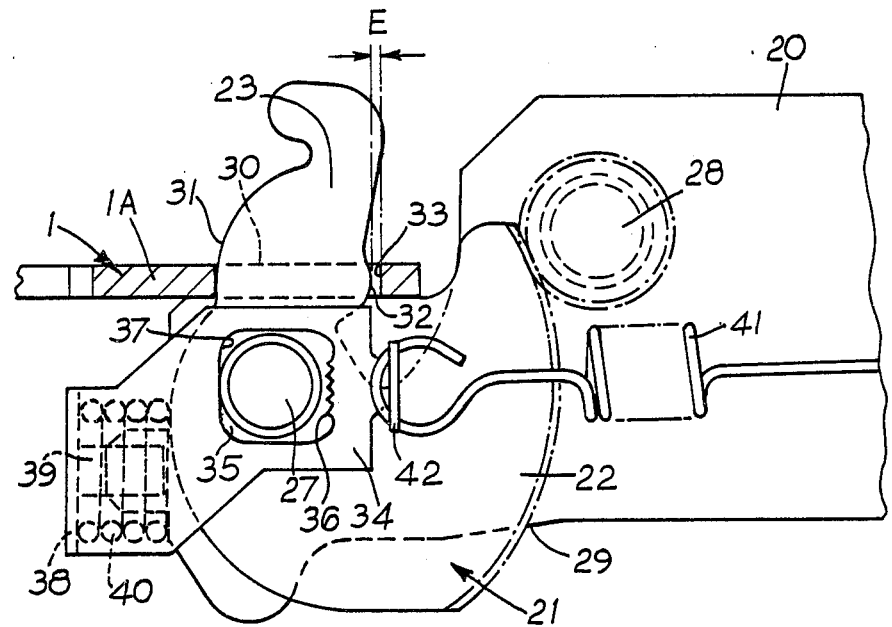
FIG. 4 is a top plan view of part of the adjuster of FIG. 3, shown an a greatly increased scale.

The drum brake illustrated in FIGS. 3 to 5 is of the same basic configuration as that described above, having brakes shoes 1, 2 engaging an abutment 3 and an actuator 4 in the manner described previously. Alternative actuation of the shoes may be provided by way of a hand brake lever (not shown) normally pivoted on one of the shoes and effective, upon angular movement, to actuate the brake mechanically, in conventional manner. An automatic strut adjuster, indicated generally at 8', extends between the shoes 1, 2 at a location adjacent the actuator 4.

As will be seen more clearly from FIGS. 4 and 5, the strut 8' is in the form of a two-part assembly, one part of which is an elongate plate 20, of which only the left hand end portion adjacent to the shoe 1 is illustrated. The plate 20 extends across the brake and its other end co-operates with the web of the other shoe 2, or with the hand brake lever, when provided. The other part of the strut assembly is a bell-crank lever 21 having a pair of arms 22 and 23. A pin 24 is rigidly secured to the lever 21 with a shank 25 thereof passing through an aperture in the lever and extending through a slot 26 formed in the plate 20, a toothed or knurled head 27 of the pin resting against the upper surface of the lever 21. By this means, the lever 21 is pivotally mounted on the plate 20 with the possibility of movement longitudinally of the plate to the extent permitted by the length of the slot 26.

A knurled or peripherally toothed stud 28 is fixed in the plate 20 at a location adjacent a facing edge of the lever arm 22 which is correspondingly knurled or toothed at 29 for meshing with the teeth or knurling on the stud 28. The toothed or knurled edge of the lever arm 22 lies on a circle centered on the pin 27. The other arm 23 of the lever 21 projects through an opening 30 in the web 1A of the shoe 1 and engages the web by way of its radially outermost edge surface 31. In the inoperative condition of the brake, as illustrated, there exists a gap E between the opposite edge surface 32 of the lever 23 and the adjacent edge surface 33 of the slot 30, this gap corresponding to the desired maximum shoe-to-drum clearance of the brake.

A locking device is provided in the form of a plate 34 having a generally rectangular slot 35 of such a size as to enable the plate to be passed over the head 27 of the pin 24, the slot being elongated slightly in the longitudinal direction of the strut to provide a clearance for the purpose to be described. The radially outwardly facing edge 36 of the slot is knurled or toothed to correspond to the knurling or teeth on the head 27, but the opposed edge 37 of the slot has a flat surface. The radially outermost end portion of the plate 34 is bent downwardly beyond the end of the strut assembly to form a depending portion 38 and a portion 39 is bent inwardly so as closely to underlie the plate 20 in order to retain the locking plate 34 in position. A body of (SME) material, in the form of a spiral coil 40, is disposed so that one end abuts against the depending portion 38 of the plate 34 and the other end abuts against the adjuster lever. A spring 41 is engaged at one end in the plate 20 and at its other end with an upstanding lug 42 of the plate 34, the spring 41 being a tension spring and acting to urge the plate 34 radially inwardly so that the straight edge 37 of the slot 35 engages against the head 27 of the pin 24. In doing so, it also urges the bell-crank lever 21 via the pin 24 in the same direction so that the toothed edge 29 of the lever arm 22 is held firmly in mesh with the stud 28.

The brake shoes 1 and 2 are urged into braking engagement with the drum by the action of the actuator 4 and, in the unworn condition of the linings, this movement will be just sufficient to close the gap E and the adjuster will not be brought into operation. Under normal temperature conditions of use, as wear of the linings occurs, the outward movement of the shoes upon actuation of the brake will exceed the dimension of the gap E and the edge 33 of the slot 30 in the shoe web 1A will act to urge the bell-crank lever 21 radially outwardly and disengage it from the stud 28. Once disengaged from the stud, the bell-crank lever is moved angularly by the shoe about the head 27 of the pin 24 through an angle corresponding to the excess shoe movement, so that when the brake is released, the arm 22 of the bell-crank lever becomes re-engaged with the stud 28 at a new position and is held in that position by re-meshing of the teeth or knurling on the arm and stud. The surface 31 of the lever arm 23 is displaced radially outwardly from its previous position by the radial movement of the bell-crank lever and the effective length of the strut is thereby increased to hold the shoes in a new adjusted position nearer to the drum surface.

In the event that the brake is subjected to excessively high temperature, as for example as a result of frequent brake application during a steep downhill decent, the drum expands. However, the excessive temperature causes the (SME) thermal compensating coil 40 to increase rapidly and substantially in length and urge the locking plate 34 to the left, as seen in FIG. 5, against the action of the spring 41, until the toothed internal edge 36 of the slot 35 meshes with the head 27 of the pin 24. If the brakes are now applied, the force of the (SME) coil is sufficiently great to pull the bell-crank lever 21 bodily to the left, against the action of the spring 41, so as to maintain the surface 31 of the lever arm 23 against the radially outermost edge of the slot 30, thereby maintaining the built-in clearance of the gap E and preventing adjustment of the brake taking place. If the shoe movement is great enough to cause the lever arm 21 to be moved out of engagement with the stud 28, the aforesaid engagement of the locking plate 34 with the head 27 of the pin 24 will prevent rotation of the bell-crank lever so that the lever arm 22 will re-engage the stud 28 in an unchanged attitude when the brakes are released.

As the drum cools, the coil 40 shrinks towards its initial length and the locking plate 34 is released from the pin 24, enabling normal adjustment to be resumed. In fact, the first brake application to be made after cooling of the drum will instantly re-adjust the brake to compensate for any lining wear which has occurred over the duration of the excessive temperature condition.

Although the thermal compensating body is shown, in the embodiments described, as a coil 18, 40, it is possible for this device to take other forms, such as a tube for example. However, for the embodiment of FIGS. 1 and 2, this would have to be substantial enough to sustain compressive loads without buckling since it would not be compressible in the manner of a coil.

Figure 2:
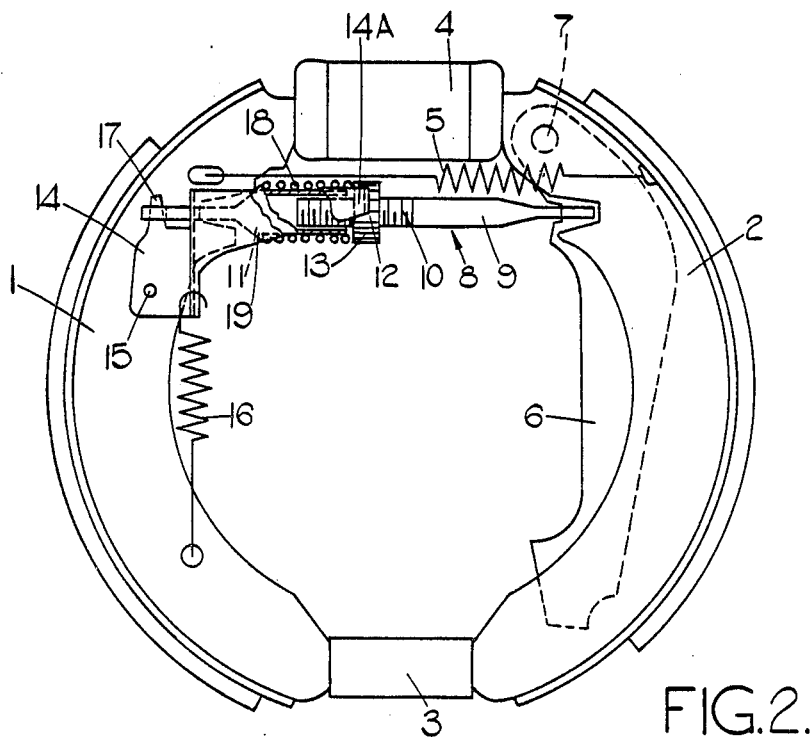
FIG. 2 is a similar view to FIG. 1 illustrating the brake with the adjuster in an elevated temperature condition and the brake shoes in an operative position.

In a further alternative example of an arrangement which operates to disable the adjuster upon the occurrence of excessive temperature the coil 18 of FIGS. 1 and 2 may be dispensed with and the pawl spring 16 made of, or at least incorporate, (SME) material so that the spring will expand upon occurrence of excessive temperature in the brake and will exert insufficient force on the pawl 14 to actuate the adjuster. This alternative arrangement can also be applied to other forms of pawl-operated adjuster in which operation of a pawl is controlled by a separate spring.

A further alternative embodiment of a pawl-operated adjuster of the invention includes a body of (SME) material in the pawl itself. This can either be secured between two separate parts of the pawl or located between a pair of telescopically engaged parts of the pawl, in both cases acting to increase the length of the pawl, upon the occurrence of excessive temperature conditions, to disengage the pawl from a toothed wheel or other device normally actuated by the pawl to effect adjustment of the brake, and thereby prevent adjustment from taking place for the duration of said excessive temperature conditions.

The preferable shape memory effect material for use as the temperature compensating body is that marketed by Delta Memory Metal Company under the designation "SME BRASS", although the use of other shape memory effect materials are not excluded from the scope of the invention.

We claim:

1. An automatic adjuster for a shoe drum brake having an automatically variable length operable, in use, in response to wear of the brake shoe linings, to maintain a predetermined maximum shoe to drum clearance, comprising a two-part strut extending between the shoes of the brake, a first strut part operatively connected to one brake shoe, a second strut part in the form of an adjuster lever pivotally mounted on said first strut part, a projection on said lever operatively connected with the other brake shoe, rigid toothed means on said first strut part, means on said adjuster lever operatively engageable with said toothed means to prevent angular movement of said adjuster lever about its pivotal mounting when in the engaged position, means to facilitate disengagement of said lever from said toothed means and angular movement of said lever due to excessive separation of the brake shoes upon brake actuation as a result of wear of friction linings on the brake shoes, so that upon release of the brake said lever re-engages said toothed means in a different position to increase the effective length of said two-part strut, a movable locking device operably engageable with said adjuster lever in a locking position to prevent said angular movement of said adjuster lever when moved into engagement therewith, and a thermally responsive body of shape memory effect material operatively engaging said locking device to move said locking device into said locking position, at least during brake actuation, in response to a predetermined increase in temperature of the brake to prevent said angular movement of said adjuster lever.

2. An adjuster according to claim 1 wherein said adjuster lever and locking device are provided with complementary toothed formations which are disengaged during normal operation of the brake, but brought into engagement by the action of said body of material in response to said increase in temperature, in order to prevent said angular movement of the adjuster lever.

3. An adjuster according to claim 2 wherein a rigid toothed projection is provided on said adjuster lever, said locking device is in the form of a plate having an aperture therein to provide first and second surfaces lying respectively at opposite sides of said toothed projection, said first surface being toothed, and spring means to urge said plate towards a position in which said toothed surface is spaced from said projection and the second surface engages said projection, expansion of said body of material moving said plate to bring the teeth on said first surface into engagement with said toothed projection thereby to prevent angular movement of the adjustment lever upon actuation of the brake.

4. An adjuster according to claim 3 wherein said spring means comprises a spring extending between said plate and said first strut part, said spring also acting to urge said adjuster lever firmly into said engaged position with said toothed means on said first strut part.

5. An adjuster according to claim 3 or claim 4 wherein said plate is shaped to provide an abutment engaging one end of said body of material, and the other end of said body abuts said adjuster lever.

* * * * *